United States Patent [19]
Kyker

[11] 3,867,341
[45] Feb. 18, 1975

[54] METAL 8-HYDROXYQUINOLATE COMPLEXES AS STABILIZERS FOR POLY(PHOSPHAZENES) TO INHIBIT THERMAL DEGRADATION AT ELEVATED TEMPERATURES

[75] Inventor: Gary Stephen Kyker, Uniontown, Ohio

[73] Assignee: The Firestone Tire & Rubber Company, Akron, Ohio

[22] Filed: Sept. 28, 1973

[21] Appl. No.: 401,769

[52] U.S. Cl........260/45.75 R, 260/45.8 NW, 260/45.75 W, 45.75 G
[51] Int. Cl............................................ C08g 51/62,
[58] Field of Search...... 260/2 P, 45.75 R, 45.8 NW

[56] References Cited
UNITED STATES PATENTS

| | | | |
|---|---|---|---|
| 2,586,312 | 2/1952 | Dishon et al. | 260/2 P |
| 3,272,773 | 9/1966 | Edison | 260/45.75 R |
| 3,474,052 | 10/1969 | Halasa et al. | 260/2 P |
| 3,515,688 | 6/1970 | Rose | 260/33.8 R |
| 3,700,629 | 10/1972 | Reynard et al. | 260/32.8 N |
| 3,766,157 | 10/1973 | Parts et al. | 260/45.75 R |

*Primary Examiner*—V. P. Hoke

[57] ABSTRACT

Stabilization of polyphosphazenes against thermal degradation is acheived by the incorporation of organometallic compounds, particularly metal complexes of 8-hydroxyquinolates or other metal complexes in such phosphazene polymers.

9 Claims, No Drawings

METAL 8-HYDROXYQUINOLATE COMPLEXES AS STABILIZERS FOR POLY(PHOSPHAZENES) TO INHIBIT THERMAL DEGRADATION AT ELEVATED TEMPERATURES

This invention relates to the protection of poly(phosphazenes) from thermal degradation when exposed to temperatures up to about 500°F in service fluids, inert atmospheres and in an oxidizing environment such as air, and to the incorporation of metal 8-hydroxyquinolate complexes in such poly(phosphazenes) to inhibit thermal degradation of same.

Poly(phosphazenes) have recently attracted attention due to a very desirable combination of properties which they possess and are the subject of several recent U.S. Patents including the following:

| Allcock et al | 3,370,020 | issued February 20, 1968 |
| Rose | 3,515,688 | issued June 2, 1970 |
| Reynard et al | 3,700,629 | issued October 24, 1972 |
| Rose et al | 3,702,833 | issued November 14, 1972 |

In the present Specification, the term poly(phosphazenes) is intended to include the polymers described in the above noted patents and any other such materials represented by the general formula

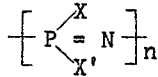

in which X and X' each represent monovalent groups including alkoxy, substituted alkoxy, especially fluoroalkoxy, aryloxy, substituted aryloxy, amino, and other such groups, and X and X' may be the same or they may differ, and $n$ is an integer greater than 3 and up to 50,000.

Previous efforts to inhibit the thermal degradation of such poly(phosphazenes) have been directed to the incorporation therein of basic metal oxides or similar compounds or of metal dithiocarbamates. Metal oxides are insoluble in these polymers and hence have a relatively low level of activity. Metal dithiocarbamates are partially soluble in these polymers, but are limited in use by the fact that they promote crosslinking (gelation) on extended aging and they are incompatible with peroxide curatives.

The principal object of the present invention is the protection of poly(phosphazenes) from thermal degradation by the addition of stabilizers which are compatible with the poly(phosphazenes) and which are effective when used in smaller quantities than the amounts of insoluble stabilizers heretofore used.

Another object of the invention is to stabilize poly(phosphazenes) against thermal degradation by means of an additive which does not promote gel formation on external aging and which does not adversely affect vulcanization of the polymers.

A further object of the invention is to provide a stabilizer which can be added to the polymer, in solution, or which can be added to the polymer in any of the usual mixing apparatus such as mill, Brabender, or Banbury mixing or kneading, without special procedures.

These and other objects of the invention will become apparent from the description of preferred embodiments of the invention which are intended to illustrate the same and are not intended to limit the invention in any way.

EXAMPLE 1

Bis(8-hydroxyquinoline) zinc II was synthesized by dissolving zinc chloride ($ZnCl_2$) in distilled water and adding two equivalents of 8-hydroxyquinoline dissolved in ethanol to the aqueous solution of zinc chloride. A yellow solid precipitated from the solution and was recovered from the solution, washed free of zinc chloride, using distilled water and then dried in a vacuum oven at 60°C.

Portions of the recovered bis(8-hydroxyquinoline) zinc II hereinafter designated $(8-HQ)_2Zn$ were blended with a fluoroalkoxy polyphosphazene represented by the formula; and hereinafter designated

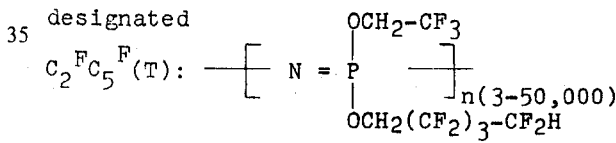

under both heterogeneous and homogeneous conditions, (i.e. in acetone and in tetrahydrofuran) in amounts ranging from 1 to 4 mole % based on the polymer.

The solvent was then removed and the dry elastomer aged in a forced-air oven at 300°F—samples were periodically removed for measurement of viscosity (DSV) and gel content (see Table 1 for results). From inspection of this data it is quite evident that this stabilizer extends the service life of this elastomer to a large extent at 300°F in air ( > 1,000 hrs.). This stabilizer functions equally well in all types of poly(phosphazenes) evaluated.

Table 1

| Dilute Solution Viscosity After Aging At 300°F | | | | | | | |
|---|---|---|---|---|---|---|---|
| Sample No. | A | B | C | D | E | F | G |
| Mole % | 0 | 1.0 | 2.0 | 4.0 | 1.0 | 2.0 | 4.0 |
| Hrs. Aged | | | | | | | |
| 0 | 1.76 | 2.57 | 1.80 | 1.82 | 1.83 | 1.83 | 1.82 |
| 24 | 1.28 | 1.72 | 1.80 | 1.82 | | | |
| 72 | | | | | 1.73 | 1.66 | 1.50 |
| 96 | 0.83 | 1.83 | 1.62 | 1.60 | | | |
| 144 | | | | | 1.54 | 1.70 | 1.60 |
| 168 | 0.71 | 1.52 | 1.49 | 1.43 | | | |
| 312 | | | | | 1.45 | 1.21 | 1.91 |
| 336 | 0.43 | 1.17 | 1.43 | 1.19 | | | |
| 456 | | | | | 1.57 | 1.65 | 1.90 |
| 480 | 0.71 | 1.58 | 1.60 | 1.48 | | | |
| 576 | | | | | 1.35 | 1.41 | 1.90 |
| 600 | 0.66 | 1.43 | 1.42 | 1.29 | | | |
| 960 | | | | | 1.51 | 1.51 | 2.4 |
| 984 | 0.68 | 1.44 | 1.49 | 1.44 | | | |
| 1296 | | | | | 1.35 | 1.41 | 1.20 |
| 1320 | | 1.42 | 1.35 | 1.26 | | | |

In samples B, C, and D, stabilizer and polyphosphazene were mixed in acetone (heteogeneous mixing) and in samples E, F, and G, stabilizer and polyphosphazene were mixed in tetrahydrofuran (homogeneous mixing).

% Gel in all samples was 0%.

EXAMPLE 2

Stabilization of $C_2{}^FC_5{}^F(T)$ Copolymer With Metal 8-Hydroxyquinolates

Selected metal 8-hydroxyquinolates were blended with $C_2{}^FC_5{}^F(T)$ copolymer in acetone. The solvent was then removed and the sample dried in vacuo. These samples were then aged at 300°F in a forced air oven and samples periodically removed for viscosity and gel measurements (see Table II). From inspection of these data it is apparent that 8-hydroxyquinolates of $Mg^{2+}$, $Al^{3+}$, and $Cr^{3+}$ are effective in retarding the thermally-induced decomposition of this polymer.

EXAMPLE 3

Stabilization of $C_2{}^FC_5{}^F(T)$ U (U = Cure Site) Terpolymer with Metal 8-Hydroxyquinolates Metal 8-hydroxyquinolate stabilizers were thoroughly mixed with samples of polymer in acetone. The samples were stripped of solvent then dried in a vacuum oven. These samples were then aged at 300°F in a forced air oven and samples were periodically withdrawn for viscosity [DSV] and gel measurements (see Table III). From inspection of this data, it is evident that 8-hydroxyquinolates of $K^{1+}$, $Zn^{2+}$, $Mg^{2+}$ and $Al^{3+}$ are effective stabilizers against heat-induced degradation of this polymer.

EXAMPLE 4

Stabilization of a Vulcanized $C_2{}^FC_5{}^F(T)$ U Terpolymer Gum with $(8\text{-}HQ)_2$ Zn A vulcanized $C_2{}^FC_5{}^F(T)$ U terpolymer gum was stabilized with $(8\text{-}HQ)_2Zn$. Table IV sets forth a comparison of the properties of two otherwise identical vulcanized gums one of which includes the stabilizer and the other does not.

Table IV

| Formulation (parts by wt.) | A | | B | |
|---|---|---|---|---|
| $C_2{}^FC_5{}^F(T)U$ | 100 | | 100 | |
| MgO | 6 | | 6 | |
| Dicumyl Peroxide | 1 | | 1 | |
| $(8\text{-}HQ)_2Zn$ | 0 | | 1 | |
| Stress-Strain (Unaged) | Value | % Change | Value | % Change |
| (Cure 30 min. at 320°F) | | | | |
| (Post Cure 24 hrs. at 212°F) | | | | |
| 100% Modulus (psi) | 62 | | 60 | |
| Tensile Strength (psi) | 230 | 260 | | |
| Elongation (%) | 160 | | 180 | |
| Aged 240 hrs. at 300°F | | | | |
| 100% Modulus (psi) | 30 | −51.7 | 47 | −21.7 |
| Tensile Strength (psi) | 140 | −39.2 | 200 | −30.0 |
| Elongation (%) | 190 | −18.8 | 165 | − 8.3 |
| Aged 240 hrs. at 350°F | | | | |
| 100% Modulus (psi) | 18 | −71.0 | 66 | +10.0 |
| Tensile Strength (psi) | 59 | −74.4 | 226 | −13.1 |
| Elongation (%) | 205 | +28.1 | 165 | − 8.3 |
| Aged 336 hrs. at 350°F | | | | |
| 100% Modulus (psi) | 16 | −74.1 | 47 | −21.6 |
| Tensile Strength | 53 | −77.0 | 214 | −17.7 |
| Elongation (%) | 210 | +31.3 | 160 | −11.1 |
| Shore A Hardness | | | | |
| Unaged | 21 | | 20 | |
| Aged 240 hrs at 300°F | 8 | −62 | 15 | −25 |
| Aged 240 hrs. at 400°F | 3 | −86 | 9 | −55 |
| ASTM % Compression Set | | | | |
| 70 hrs. at 300°F | 23 | | 13 | |

Table II

| Sample | Stabilizer | Amount phr | Dilute Solution Viscosity After Aging at 300°F | | | | | | | | | |
|---|---|---|---|---|---|---|---|---|---|---|---|---|
| | | | Hours | 0 | 24 | 48 | 72 | 120 | 240 | 408 | 480 | 720 | 1000 |
| 1 | Metal 8-HQ | None | | 2.14 | 0.80 | 0.54 | 0.48 | 0.42 | 0.52 | 0.25 | 0.25 | 0.15 | 0.15 |
| 2 | Mg+2 | 0.5 | | 2.07 | 1.41 | 1.09 | 0.95 | 0.70 | 0.60 | 0.47 | 0.46 | 0.35 | |
| 3 | Mg+2 | 1.0 | | 2.21 | 1.85 | 1.34 | 1.40 | 1.29 | 0.95 | 0.84 | 0.76 | 0.50 | |
| 4 | Mg+2 | 2.0 | | 2.07 | 1.90 | 1.66 | 1.94 | 1.34 | 0.94 | 1.57 | 1.72 | 1.68 | 1.07 |
| 5 | Al+3 | 0.5 | | 2.11 | 1.37 | 0.91 | 0.83 | 0.58 | 0.49 | 0.39 | 0.30 | 0.30 | |
| 6 | Al+3 | 1.0 | | 1.94 | 1.28 | 0.77 | 0.97 | 0.81 | 0.83 | 0.71 | 0.76 | 0.67 | 0.25 |
| 7 | Al+3 | 2.0 | | 2.16 | 1.32 | 1.16 | 1.17 | 0.88 | 0.71 | 0.62 | 0.63 | 0.55 | 0.45 |
| 8 | Cr+3 | 0.5 | | 2.23 | | 0.53 | | 0.76 | 0.75 | 0.98 | | | |
| 9 | Cr+3 | 1.0 | | 2.04 | | 0.60 | | 0.50 | 0.52 | 0.66 | | | |
| 10 | Cr+3 | 2.0 | | 2.32 | | 0.79 | | 0.54 | 0.51 | 0.53 | | | |
| 11 | Cr+3 | 4.0 | | 2.28 | | 0.70 | | 0.48 | 0.58 | 0.79 | | | |

% Gel is 0.0 in all samples

Table III

| | | Dilute Solution Viscosity After Aging at 300°F | | | | |
|---|---|---|---|---|---|---|
| | | Aging Time (Hrs) | | | | |
| Stabilizer | Mole % | 0 | 72 | 120 | 312 | 316 |
| Metal 8-HQ | 0 | 2.08 | 1.03 | 0.87 | 0.66 | 0.62 |
| K+1 | 0.5 | 2.04 | 1.64 | 1.64 | 1.33 | 1.36 |
| K+1 | 1.0 | 2.05 | 1.56 | 1.48 | 1.17 | 1.18 |
| K+1 | 2.0 | 1.77 | 1.42 | 1.29 | 0.89 | 0.75 |
| Zn+2 | 0.5 | 2.00 | 1.72 | 1.76 | 1.48 | 1.56 |
| Zn+2 | 1.0 | 2.05 | 1.78 | 1.69 | 1.48 | 1.59 |
| Zn+2 | 2.0 | 1.96 | 1.73 | 1.69 | 1.47 | 1.53 |
| Mg+2 | 0.5 | 2.05 | 1.89 | 1.83 | 1.68 | 1.72 |
| Mg+2 | 1.0 | 2.10 | 1.92 | 1.80 | 1.73 | 1.71 |
| Mg+2 | 2.0 | 2.08 | 1.86 | 1.89 | 1.72 | 1.64 |
| Al+3 | 0.5 | 2.05 | 1.70 | 1.66 | 1.34 | 1.30 |
| Al+3 | 1.0 | 1.90 | 1.63 | 1.62 | 1.32 | 1.21 |
| Al+3 | 2.0 | 2.04 | 1.26 | 1.12 | 1.49 | 1.21 |

% Gel is 0.0 in all samples.

EXAMPLE 5

Stabilization of $C_2{}^FC_5{}^F(T)$ Copolymer Stock Against Heat-Degradation at 300°F in Air A typical silica-reinforced and peroxide-cured stock was compounded for a control (A) (see Table V). Stock (B) was the same as (A) except for the addition of one phR of $(8\text{-}HQ)_2Zn$ during the mixing process (Brabender Mixer). From inspection of the stress/strain and Shore A Hardness data it is apparent that the addition of $(8\text{-}HQ)_2Zn$ improves both the normal as well as the heat-aging properties of this stock.

EXAMPLE 6

Stabilization of $C_2{}^FC_5{}^F(T)$ U Terpolymer Stock Against Heat-Degradation at 300°–350°F in Air By Use of $Zn^{2+}$, $Mg^{2+}$ and $Al^{3+}$ 8-Hydroxyquinolates A typical silica-reinforced and peroxide-cured stock was compounded for the control (A). Stocks B, C and D were of the same basic composition except for the addition of $Zn^{2+}$, $Mg^{2+}$ and $Al^{3+}$ 8-hydroxyquinolates (1 phr) during the mixing process (Brabender). From inspection of the stress/strain data it is apparent that these stabilizers do not interfere with the peroxide cure. Furthermore, these stabilizers afford a substantial improvement in the retention of physical properties upon aging at 300°–350°F in air.

A typical carbon-black reinforced and peroxide-cured stock was used for the control (E) in the next series of experiments. Stocks F and G were basically the same as E except for the addition of $Zn^{2+}$ and $Mg^{2+}$ 8-hydroxyquinolates. From inspection of the stress/strain data it is obvious that the addition of these stabilizers results in large improvements in both normal and aged properties. The data is shown in Table VI.

Table V

| Compound | A | B |
|---|---|---|
| Polymer $C_2^F C_5^F(T)$ | 100.0 | 100.0 |
| Silanox 101 | 30.0 | 30.0 |
| MgO | 6.0 | 6.0 |
| Cicumyl Peroxide | 6.0 | 6.0 |
| (8-HQ)$_2$Zn | | 1.0 |
| Aged Stress/Strain Cure 30 min. at 320°F Post Cure 24 hrs. at 212°F | | |
| 50% Modulus | | |
| Unaged | 50 | 75 |
| 120 hrs. at 300°F | 85 | 110 |
| 240 hrs. at 300°F | 100 | 120 |
| 100% Modulus | | |
| Unaged | 90 | 100 |
| 120 hrs. at 300°F | 135 | 165 |
| 240 hrs. at 300°F | 145 | 200 |
| Tensile Strength (psi) | | |
| Unaged | 1600 | 1590 |
| 120 hrs. at 300°F | 955 | 1500 |
| 240 hrs. at 300°F | 800 | 1260 |
| % Elongation | | |
| Unaged | 445 | 520 |
| 120 hrs. at 300°F | 410 | 510 |
| 240 hrs. at 300°F | 420 | 475 |
| Shore A Hardness | | |
| Cure 30 min. at 320°F Post Cure 24 hrs. at 212°F | | |
| Unaged | 47 | 51 |
| 120 hrs. at 300°F | 52 | 56 |
| 240 hrs. at 300°F | 52 | 61 |

EXAMPLE 7

Stabilization of $C_2^F C_5^F(T)$ U Terpolymer Stock (Silane-Treated Clay Reinforced and Peroxide Cure) With (8-HQ)$_2$Zn Stock (A) was compounded as the control whereas Stock (B) was of the same basic composition except for the addition of (8-HQ)$_2$Zn (1 phR). From inspection of the stress-strain and Shore A Hardness data it is apparent that this stabilizer improves stress/strain, compression set, hardness and heat-aging properties at 300°F in air. The data is shown in Table VII.

EXAMPLE 8

Stabilization of A $C_2^F C_5^F(T)$ U Terpolymer Stock Against Heat-Degradation at 400°F in Air By Use of $Zn^{2+}$ and $Mg^{2+}$ 8-Hydroxyquinolates There was no control for these studies but previous experiments had revealed that stocks without stabilizers were highly degraded after 120 hr. at 400°F. In contrast, these stocks [A(1 phR of (8-HQ)$_2$Zn) and B(1 phR of (8-HQ)$_2$Mg)] still have fairly high 100% moduli (637 and 562 psi) and tensile strength (1050 and 1037 psi) after aging 120 hr. at 400°F. Therefore, it is apparent that these stabilizers greatly improve heat-aging properties for these stocks at 400°F in air. The data is shown in Table VIII.

Table VII

| Compound | A | B |
|---|---|---|
| Polymer | 100.0 | 100.0 |
| Burgess KE | 40.0 | 40.0 |
| MgO | 6.0 | 6.0 |
| Dicumyl Peroxide | 3.0 | 3.0 |
| (8-HQ)$_2$Zn | | 1.0 |
| Aged Stress/Strain Cure 30 min. at 320°F Post Cure 24 hrs. at 212°F | | |
| 50% Modulus (psi) | | |
| Unaged | 50 | 125 |
| 120 hrs. at 300°F | 12 | 40 |
| 240 hrs. at 300°F | degraded | 75 |
| 100% Modulus (psi) | | |
| Unaged | 150 | 625 |
| 120 hrs. at 300°F | 12 | 775 |
| 240 hrs. at 300°F | degraded | 700 |
| Tensile Strength (psi) | | |
| Unaged | 625 | 750 |

Table VI

| Compound | A | B | C | D | E | F | G |
|---|---|---|---|---|---|---|---|
| Polymer $C_2^F C_5^F(T)$U | 100 | 100 | 100 | 100 | 100 | 100 | 100 |
| Silanox 101 | 20 | 20 | 20 | 20 | | | |
| Aerosil 300 | 5 | 5 | 5 | 5 | | | |
| HAF Black | | | | | 25 | 25 | 25 |
| MgO | 6 | 6 | 6 | 6 | 6 | 6 | 6 |
| Dicumyl Peroxide | 2 | 2 | 2 | 2 | 2 | 2 | 2 |
| (8-HQ)$_2$Zn | | 1 | | | | 1 | |
| (8-HQ)$_2$Mg | | | 1 | | | | 1 |
| (8-HQ)$_2$Al | | | | 1 | | | |
| Stress/Strain | | | | | | | |
| 100% Modulus (psi) | | | | | | | |
| Unaged | 1140 | 670 | 855 | 885 | 400 | 405 | 590 |
| 240 hrs. at 300°F | 895 | 800 | 820 | 675 | 140 | 265 | 315 |
| 120 hrs. at 350°F | 595 | 680 | 715 | 560 | 62 | 165 | 170 |
| Tensile Strength (psi) | | | | | | | |
| Unaged | 1780 | 1660 | 1560 | 1610 | 1590 | 1530 | 1740 |
| 240 hrs. at 300°F | 1525 | 1460 | 1560 | 1530 | 300 | 945 | 1160 |
| 120 hrs. at 350°F | 885 | 1110 | 1165 | 1025 | 75 | 285 | 270 |
| Elongation % | | | | | | | |
| Unaged | 110 | 150 | 130 | 125 | 205 | 205 | 190 |
| 240 hrs. at 300°F | 180 | 170 | 160 | 150 | 245 | 265 | 240 |
| 120 hrs. at 350°F | 130 | 155 | 150 | 165 | 270 | 245 | 245 |
| Shore A Hardness | | | | | | | |
| Unaged | 74 | 72 | 73 | 69 | | 47 | 44 |
| 120 hrs. at 300°F | 76 | 75 | 77 | 72 | | 51 | 47 |
| 240 hrs. at 300°F | 79 | 77 | 75 | 71 | | 53 | 53 |
| 72 hrs. at 350°F | 77 | 76 | 75 | 72 | | 50 | 49 |
| 120 hrs. at 350°F | 78 | 77 | 78 | 73 | | 50 | 50 |

Table VII-Continued

| Compound | A | B |
|---|---|---|
| 120 hrs. at 300°F | 12 | 840 |
| 240 hrs. at 300°F | degraded | 800 |
| % Elongation | | |
| Unaged | 250 | 105 |
| 120 hrs. at 300°F | 200 | 105 |
| 240 hrs. at 300°F | degraded | 120 |
| ASTM % Compression Set | | |
| (method B 22 hrs. at 212°F) | 75 | 13 |
| Shore A Hardness | | |
| Unaged | 34 | 51 |
| 120 hrs. at 300°F | 36 | 51 |
| 240 hrs. at 300°F | 34 | 54 |

Table VIII

| Compound | A | B |
|---|---|---|
| Polymer $C_2{}^FC_5{}^F(T)U$ | 100 | 100 |
| Silanox 101 | 30 | 30 |
| MgO | 6 | 6 |
| Dicumyl Peroxide | 2 | 2 |
| $(8\text{-}HQ)_2Zn$ | 2 | |
| $(8\text{-}HQ)_2Mg$ | | 2 |
| Stress/Strain | | |
| Cure 30 min. at 320°F | | |
| Post Cure 24 hrs. at 212°F | | |
| 100% Modulus (psi) | | |
| Unaged | 862 | 725 |
| 120 hrs. at 400°F | 637 | 562 |
| 240 hrs. at 400°F | 500 | 465 |
| 240 hrs. at 350°F | 900 | 950 |
| 336 hrs. at 350°F | 896 | 809 |
| 336 hrs. at 300°F | 760 | 912 |
| 672 hrs. at 300°F | 902 | 960 |
| Tensile Strength (psi) | | |
| Unaged | 1500 | 887 |
| 120 hrs. at 400°F | 1050 | 1037 |
| 240 hrs. at 400°F | 730 | 705 |
| 240 hrs. at 350°F | 1688 | 1250 |
| 336 hrs. at 350°F | 1244 | 1183 |
| 336 hrs. at 300°F | 1938 | 1925 |
| 672 hrs. at 300°F | 1738 | 1797 |
| Elongation % | | |
| Unaged | 120 | 90 |
| 120 hrs. at 400°F | 160 | 170 |
| 240 hrs. at 400°F | 175 | 175 |
| 240 hrs. at 350°F | 150 | 115 |
| 336 hrs. at 350°F | 130 | 140 |
| 336 hrs. at 300°F | 160 | 145 |
| 672 hrs. at 300°F | 150 | 140 |
| Shore A Hardness | | |
| Unaged | 66 | 65 |
| 240 hrs. at 400°F | 73 | 76 |
| 336 hrs. at 400°F | 80 | 75 |
| 240 hrs. at 350°F | 72 | 70 |
| 336 hrs. at 350°F | 74 | 71 |
| 336 hrs. at 300°F | 71 | 71 |
| 672 hrs. at 300°F | 72 | 72 |

EXAMPLE 9

Stabilization of $[(C_5H_{11}O)(C_6H_5O) \text{ U } P=N]_n$ Terpolymer Stock with $(8\text{-}HQ)_2$ Zn

This terpolymer was treated with $(8\text{-}HQ)_2Zn$ (3 mole %) in THF (homogeneous), stripped of solvent then dried in a vacuum oven. A small portion of this stabilized gum was aged at 300°F in a forced air oven and samples were periodically withdrawn for viscosity [DSV] and gel measurements (see Table IX, footnotes 2, 3). From inspection of this data, it is apparent that $(8\text{-}HQ)_2Zn$ is an active stabilizer for this polymer just as it was for $C_2{}^FC_5{}^F(T)$ and $C_2{}^FC_5{}^F(T)$ (U)-type polymers. Both the control and the stabilized gums were then compounded with reinforcing silicas and curing agents in a Brabender Mixer. Both the sulfur-accelerator cured stock (B) and the peroxide cured stock (D) showed a large improvement in normal and aged (300°F) stress/strain properties relative to the controls (A) and (C) respectively. Thus the stabilizer is effective for nonfluorinated as well as fluorinated polyphosphazenes and also works well in both gum and reinforced and vulcanized stocks.

This terpolymer is a polyphosphazene represented by the general formula

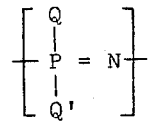

in which Q and Q' represent monovalent alkoxy $(C_5H_{11}O)$ and aryloxy $(C_6H_5O)$ groups randomly distributed along the —P=N— backbone, and wherein a group with some unsaturation to serve as a cure site, also randomly distributed along the chain, is present in place of some of the Q or Q' groups.

Table IX

| Formulation | A | B | C | D |
|---|---|---|---|---|
| Polymer | 100[2] | 100[3] | 100[2] | 100[3] |
| Silanox 101 | 40 | 40 | 40 | 40 |
| Aerosil 380 | 5 | 5 | 5 | 5 |
| Zinc Oxide | 5 | 5 | 5 | 5 |
| Sulfur | 0.5 | 0.5 | — | — |
| Accelerators | 5.0 | 5.0 | — | — |
| Dicup 40C | — | — | 2.0 | 2.0 |
| Stabilizer $(8\text{-}HQ)_2Zn$ | — | 3.0) mole %) | — | 3.0) mole %) |
| Aged Stress/Strain | | | | |
| Cure (10 min. at 320°F) | | | | |
| Post Cure (hr. at 212°F) | None | None | 24 | 24 |
| 50% Modulus (psi) | | | | |
| Unaged | 300 | 190 | 240 | 370 |
| 120 hrs. at 300°F | 175 | 300 | 100 | 362 |
| 240 hrs. at 300°F | 125 | 250 | 75 | 250 |
| 100% Modulus (psi) | | | | |
| Unaged | | 545 | | |
| 120 hrs. at 300°F | 287 | 500 | 150 | |
| 240 hrs. at 300°F | 150 | 500 | | 600 |
| Tensile Strength | | | | |
| Unaged | 615 | 920 | 400 | 575 |
| 120 hrs. at 300°F | 400 | 650 | 167 | 425 |
| 240 hrs. at 300°F | 200 | 500 | 75 | 600 |
| % Elongation | | | | |
| Unaged | 75 | 130 | 65 | 57 |
| 120 hrs. at 300°F | 192 | 155 | 90 | 60 |
| 240 hrs. at 300°F | 130 | 100 | 50 | 100 |

[2]Control polymer — no stabilizer
[3]Polymer treated with 3 mole % $(8\text{-}HQ)_2Zn$ in THF (homogeneous). Heat Aging of Polymer (0.0% Gel in all Samples)

| | (DSV) | |
|---|---|---|
| | (2) | (3) |
| 0 hr. | 3.54 | 3.27 |
| 24 hr. | 0.35 | 0.80 |
| 48 hr. | 0.31 | 0.83 |
| 240 hr. | 0.15 | 0.34 |

In the preceding examples various tradenames and abbreviations are utilized, the meanings of which are as follows:

| | |
|---|---|
| phr | parts by weight per 100 parts of rubber (polyphosphazene) by weight |
| Silanox | Hydrophobic fumed silica |
| Burgess KE | Surface treated anhydrous aluminum silicate |
| Aerosil | Fumed silica |

Further, it should be understood that in addition to being applicable to the thermal stabilization of phosphazene copolymers, i.e., polyphosphazenes in which two different monovalent groups are attached to the P atoms in the —N=P— chain, usually through an oxygen atom, the groups being distributed randomly along the chain, the invention is applicable to homopolymers and to terpolymers, i.e. polymers with but a single substituent or polymers with two or more different substituents attached along the chain.

I claim:

1. A polyphosphazene composition stabilized against thermal aging comprising a polyphosphazene represented by the general formula:

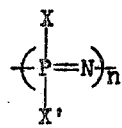

wherein $n$ represents an integer from 3 up to about 50,000 and X and X' each represent a monovalent substituent selected from the group consisting of alkoxy, substituted alkoxy, aryloxy, substituted aryloxy, hydroxy and amino, and X and X' are randomly distributed along the —P=N— backbone and the polyphosphazene includes one or two or more randomly distributed groups and an organometallic compound compatible with said polyphosphazene and present in an amount sufficient to stabilize said polyphosphazene against thermal degradation, said organometallic compound being a metal 8-hydroxyquinolate.

2. Polyphosphazenes according to claim 1, wherein the metal is selected from the group consisting of alkali metals, alkaline earth metals including Mg, and Al, Zn and Cr.

3. Polyphosphazenes according to claim 1, wherein the stabilizer is present in an amount between 0.05 and 5.0% by weight.

4. The stabilized polyphosphazenes of claim 1, wherein X and X' are fluoroalkoxy or fluoroaryloxy groups.

5. Elastomers consisting essentially of the stabilized polyphosphazenes of claim 1.

6. Plastics consisting essentially of the stabilized polyphosphazenes of claim 1.

7. Thermoplastic elastomers consisting essentially of the stabilized polyphosphazenes of claim 1.

8. Fibers consisting essentially of the stabilized polyphosphazenes of claim 1.

9. Vulcanized articles consisting essentially of the stabilized polyphosphazenes of claim 1.

* * * * *

PO-1050
(5/69)

UNITED STATES PATENT OFFICE
CERTIFICATE OF CORRECTION

Patent No. 3,867,341      Dated February 18, 1975

Inventor(s) Gary Stephen Kyker

It is certified that error appears in the above-identified patent and that said Letters Patent are hereby corrected as shown below:

In Column 2, Line 35, delete "designated".

In Column 4, Table IV, Line 24, under the heading "% Change", first occurrence, "-18.8" should read -- +18.8 --.

In Column 5, Table V, Line 25, under the heading "Compound", "Cicumyl" should read -- Dicumyl --.

Signed and sealed this 29th day of April 1975.

(SEAL)
Attest:

RUTH C. MASON
Attesting Officer

C. MARSHALL DANN
Commissioner of Patents
and Trademarks